(12) United States Patent
Zaderey et al.

(10) Patent No.: US 7,827,723 B1
(45) Date of Patent: Nov. 9, 2010

(54) LATERAL DE-CENTERING OF RIFLESCOPE OBJECTIVE FOR AIMING ADJUSTMENT

(75) Inventors: Sergey Yury Zaderey, Hillsboro, OR (US); Rick R. Regan, Aloha, OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 45 days.

(21) Appl. No.: 11/876,702

(22) Filed: Oct. 22, 2007

Related U.S. Application Data

(60) Provisional application No. 60/862,436, filed on Oct. 20, 2006.

(51) Int. Cl.
*F41G 1/38* (2006.01)

(52) U.S. Cl. .............................. 42/122; 42/124; 42/125; 42/126

(58) Field of Classification Search ........................ None
See application file for complete search history.

(56) References Cited

U.S. PATENT DOCUMENTS

| | | | |
|---|---|---|---|
| 1,607,688 A | | 11/1926 | Perrin et al. |
| 2,143,167 A | | 1/1939 | Pechar |
| 2,150,629 A | * | 3/1939 | Mossberg .................... 356/247 |
| 2,424,011 A | | 7/1947 | De Gramont |
| 2,913,826 A | * | 11/1959 | Petty ........................... 42/122 |
| 3,161,716 A | | 12/1964 | Burris et al. |
| 3,184,852 A | | 5/1965 | Hageman |
| 3,297,389 A | * | 1/1967 | Gibson ........................ 359/424 |
| 3,359,849 A | * | 12/1967 | Friedman .................... 356/153 |
| 3,506,330 A | * | 4/1970 | Allen .......................... 356/397 |
| 3,642,341 A | | 2/1972 | Seifried |
| 3,684,376 A | | 8/1972 | Lessard |
| 3,826,012 A | * | 7/1974 | Pachmayr .................... 42/122 |
| 4,200,355 A | * | 4/1980 | Williams, Jr. ............... 359/424 |
| 4,247,161 A | * | 1/1981 | Unertl, Jr. .................... 359/424 |
| 4,389,791 A | * | 6/1983 | Ackerman .................... 42/122 |
| 4,408,842 A | | 10/1983 | Gibson |
| 4,806,006 A | | 2/1989 | Nathan |
| 4,806,007 A | | 2/1989 | Bindon |
| 4,864,339 A | | 9/1989 | Gross et al. |
| 4,969,723 A | | 11/1990 | Kato et al. |
| 5,020,892 A | * | 6/1991 | Glover et al. ................ 359/399 |
| 5,283,427 A | * | 2/1994 | Phillips et al. ........ 250/214 VT |
| 5,513,440 A | * | 5/1996 | Murg ............................ 42/122 |
| 5,528,847 A | * | 6/1996 | Fisher et al. .................. 42/122 |
| 5,745,287 A | * | 4/1998 | Sauter ......................... 359/428 |
| 5,771,595 A | * | 6/1998 | Bell ............................. 42/122 |

(Continued)

FOREIGN PATENT DOCUMENTS

DE 2 259 913 6/1973

*Primary Examiner*—Troy Chambers
*Assistant Examiner*—Samir Abdosh
(74) *Attorney, Agent, or Firm*—Stoel Rives LLP

(57) ABSTRACT

A riflescope includes an objective lens component slidably supported on a guide track oriented perpendicular to an optic axis of the objective lens component for lateral, non-pivoting movement of the objective lens component in or along a plane perpendicular to the optic axis. Movement of the objective lens component shifts an image of a target in the field of view relative to an aiming mark displayed in the riflescope. In a preferred embodiment, a transparent optical window is fixedly mounted forwardly of the objective lens element and sealed to the riflescope housing.

21 Claims, 3 Drawing Sheets

U.S. PATENT DOCUMENTS

| | | |
|---|---|---|
| 5,771,623 A | 6/1998 | Pernstich et al. |
| 6,005,711 A | 12/1999 | Mai et al. |
| 6,519,890 B1 * | 2/2003 | Otteman ................. 42/122 |
| 6,691,447 B1 * | 2/2004 | Otteman ................. 42/122 |
| 7,142,357 B2 * | 11/2006 | Greenslade ............ 359/353 |
| 7,355,790 B1 * | 4/2008 | Wagner et al. ......... 359/424 |
| 7,437,848 B2 * | 10/2008 | Chang ..................... 42/119 |
| 2006/0048432 A1 * | 3/2006 | Staley, III ............... 42/122 |
| 2006/0168871 A1 * | 8/2006 | Wagner .................. 42/122 |
| 2007/0137089 A1 * | 6/2007 | William et al. .......... 42/122 |

* cited by examiner

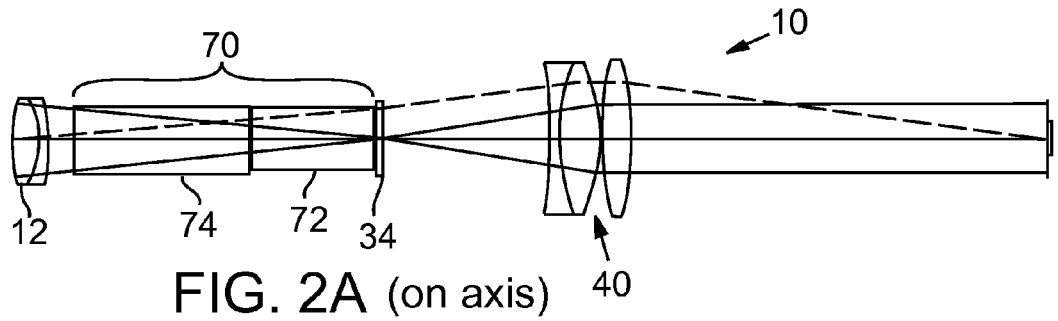
FIG. 2A (on axis)
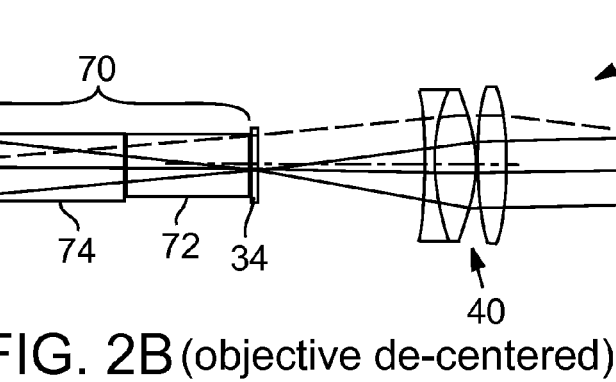
FIG. 2B (objective de-centered)
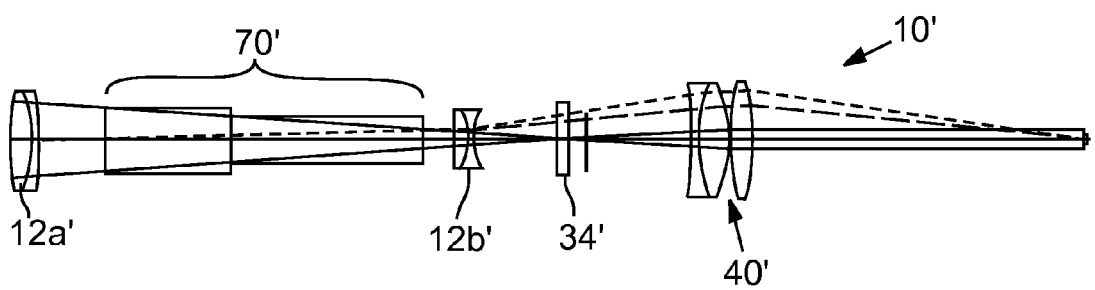
FIG. 3A (on axis)
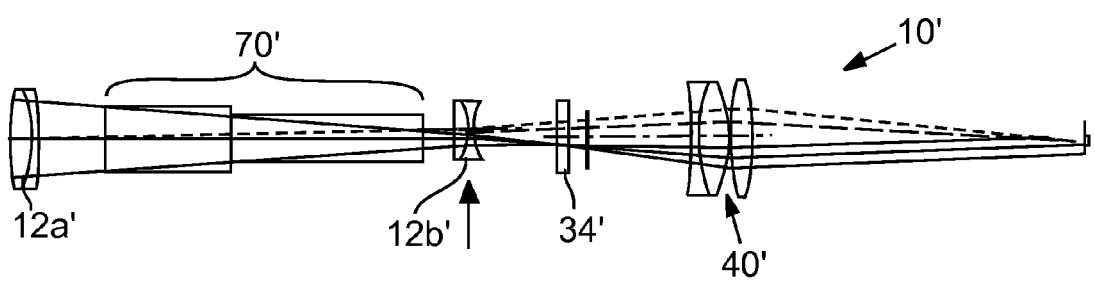
FIG. 3B (secondary objective de-centered)

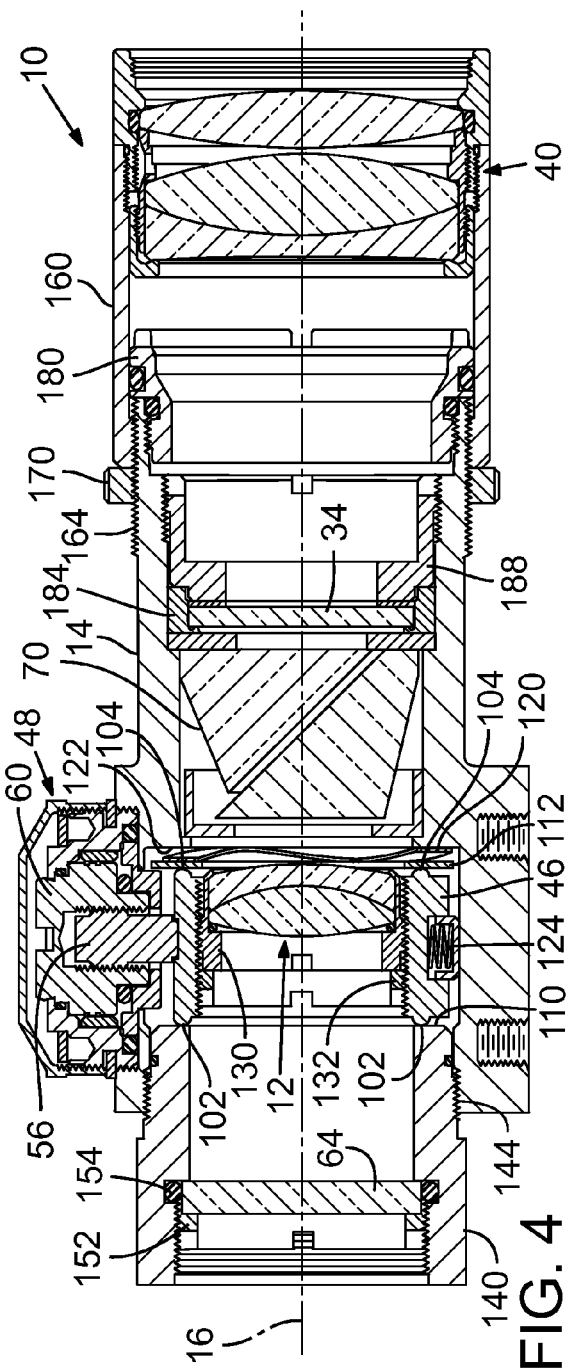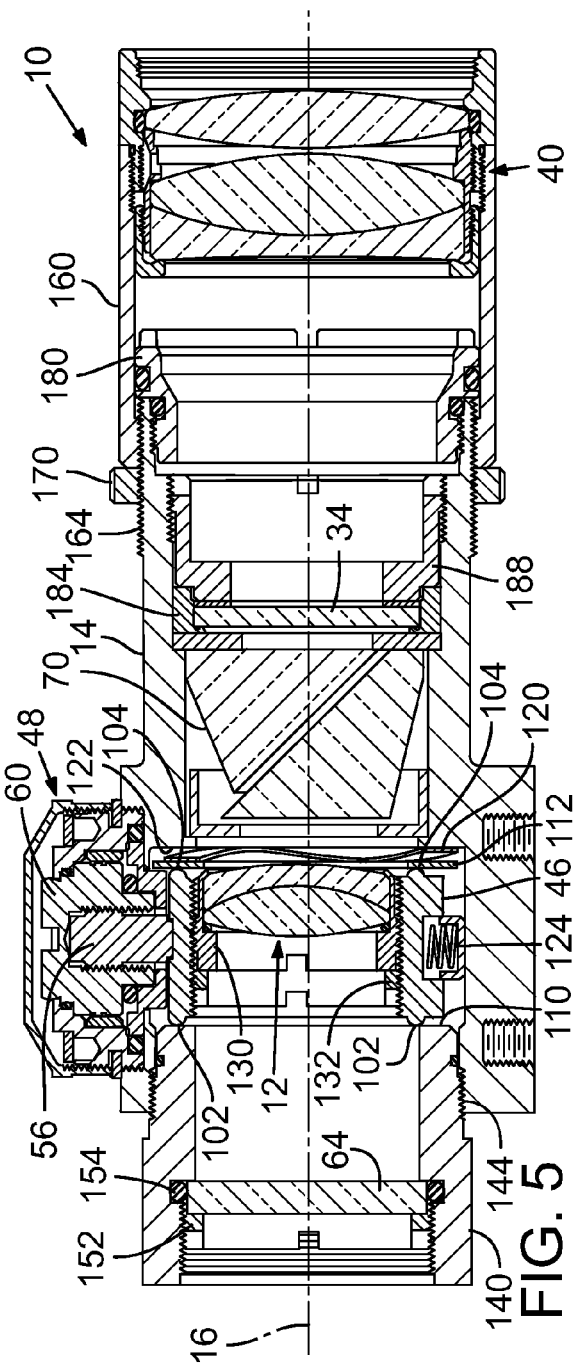

LATERAL DE-CENTERING OF RIFLESCOPE OBJECTIVE FOR AIMING ADJUSTMENT

RELATED APPLICATION

This application claims the benefit under 35 U.S.C. §119(e) from U.S. Provisional Application No. 60/862,436, filed Oct. 20, 2006, which is incorporated herein by reference.

TECHNICAL FIELD

The present disclosure relates to riflescopes and, more particularly, to devices and methods for effecting aiming adjustments in a riflescope.

BACKGROUND OF THE INVENTION

Conventional riflescopes include objective and eyepiece lens systems positioned at opposite ends of an elongate tubular housing, and an image erecting lens system placed between the objective and eyepiece lens systems. An aiming reticle including crosshairs or another aiming pattern is typically placed either at a first focal plane, between the objective and erector, or at a second focal plane, between the erector and eyepiece.

Several different mechanisms are known for adjusting the aim of a riflescope to compensate for crosswinds (windage) and/or ballistic drop (elevation). These mechanisms include: (1) a scope mount that adjusts the alignment of an entire riflescope relative to the firearm on which the scope is mounted, as described in U.S. Pat. No. 2,143,167 of Pechar; (2) a mechanism for laterally adjusting the position of the reticle within the housing relative to the image formed at one of the image planes of the scope, as described in U.S. Pat. No. 2,913,826 of Petty; (3) a pivoting mount for the erector lens system (usually a "pivot tube"), which enables the erector lens system to be pivotably moved from center to change the lateral position of the image formed at the second focal plane, where a reticle is located, as described in U.S. Pat. No. 3,161,716 of Burris et al., U.S. Pat. No. 3,184,852 of Hageman, U.S. Pat. No. 3,684,376 of Lessard, and U.S. Pat. No. 4,408,842 of Gibson (NB: In some of these systems the pivot tube is pivotably supported near the eyepiece, and in others the pivot tube is pivotably supported near the objective.); and (4) Pivoting of an image erecting prism system onto which a reticle pattern is projected, as described in U.S. Pat. No. 4,806,007 of Bindon.

U.S. Pat. No. 5,771,623 of Pernstich et al. describes a telescopic sight including an objective lens that is also the objective lens of an integrated laser rangefinder receiver. Pernstich et al. describe a movable objective that simultaneously adjusts the point of aim of the telescopic sight and the aim of the laser rangefinder. In one embodiment, shown in FIG. 2 of the '623 patent, the objective is mounted within a pivot mount. In another embodiment, shown in FIG. 2A of the '623 patent, a "partial lens" of the objective is mounted in a cage that is deflected laterally by a pair of adjusting screws. The cage is connected to the scope housing by a set of spring pins. Due to the arrangement of the spring pins, any lateral adjustment of the partial lens would also necessarily impart some tilting or pivoting of the partial lens and some displacement of the partial lens longitudinally along the optical axis of the telescopic sight, similarly to the embodiment of FIG. 2 of the '623 patent.

The present inventor has identified a need for an improved aiming mechanism for a riflescope.

BRIEF DESCRIPTION OF THE DRAWINGS

FIG. 2A is a ray trace diagram of the optical configuration of the riflescope of FIG. 1, with a movable objective component shown on axis (centered);

FIG. 2B is a ray trace diagram of the optical configuration of the riflescope of FIG. 1, with a movable objective component shown de-centered;

FIG. 3A is a ray trace diagram of an optical configuration for a riflescope according to another embodiment, with a movable secondary objective component shown on axis (centered);

FIG. 3B is the ray trace diagram of the riflescope optical system of FIG. 3A, with a movable secondary objective component shown de-centered;

FIG. 4 is a cross section view of a riflescope showing mechanical detail of a movable objective lens component and adjustment mechanism, shown in an on-axis position (centered); and FIG. 5 is an auxiliary cross section view of the riflescope of FIG. 4 with the movable objective lens component shown de-centered upwardly.

DETAILED DESCRIPTION OF PREFERRED EMBODIMENTS

Figure 1:
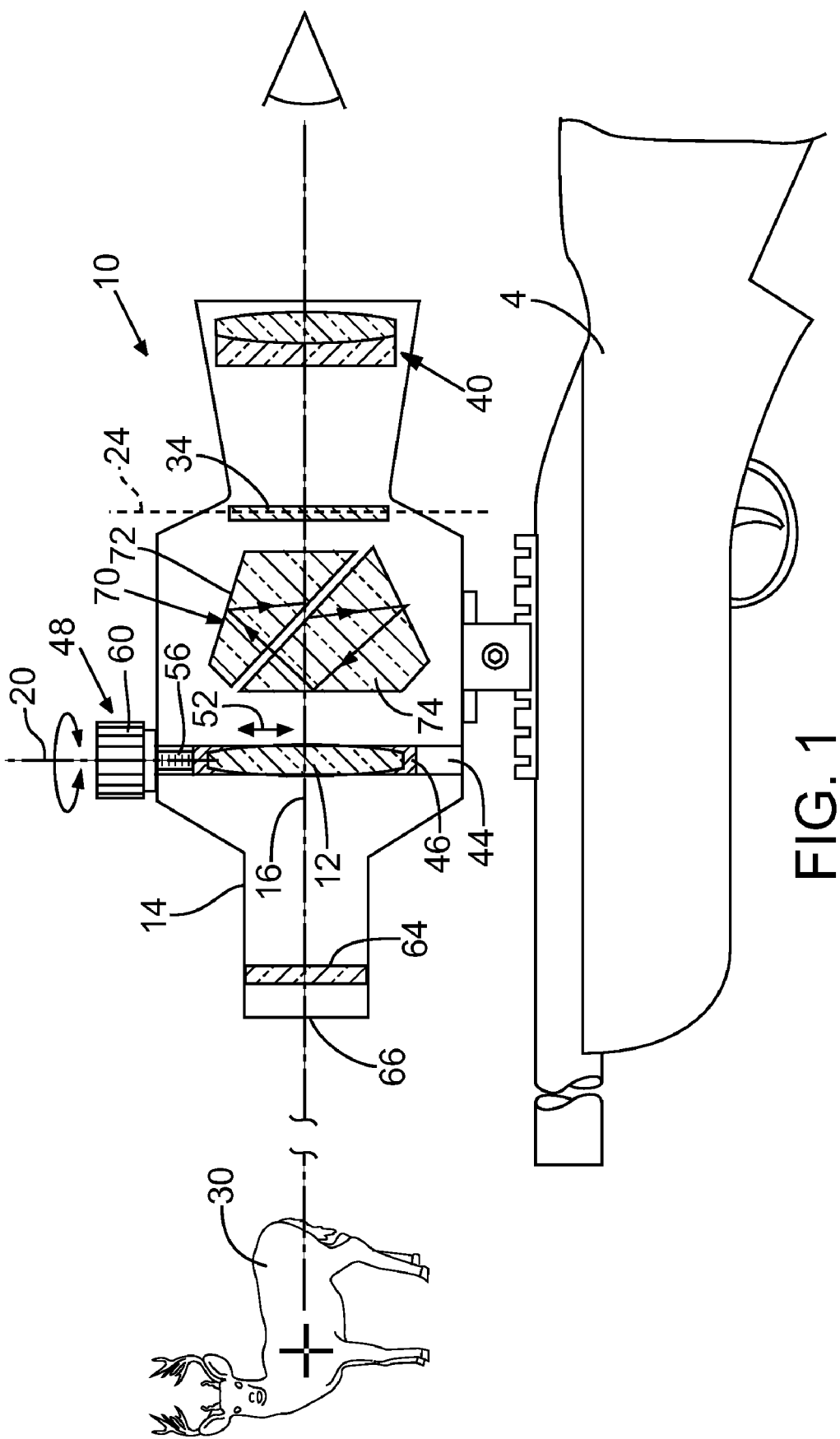
FIG. 1 is a schematic cross section view of a riflescope.

FIG. 1 shows a schematic cross section view of a riflescope 10 in accordance with one embodiment mounted on a firearm 4. With reference to FIG. 1, riflescope 10 includes an objective lens component 12 supported within a housing 14 of the riflescope for lateral movement perpendicular to an optic axis 16 of the objective lens component 12 and in a plane 20 parallel to an image plane 24, to shift the image of a distant target 30 produced at image plane 24 laterally relative to a reticle 34 positioned at or near image plane 24. An eyepiece lens system 40 is mounted at an end of housing 14 opposite objective lens component 12.

Objective lens component 12 is preferably slidably supported on or in a track 44 formed in housing 14, or by another mechanical slide arrangement, for movement in plane 20 and perpendicular to the optical axis 16 of the objective lens element without appreciable pivoting or tilting of objective lens component 12 relative to housing 14. Objective lens component 12 may be mounted in a carriage 46 that is slidably seated in or on track 44 that guides objective lens component 12 for precise sliding movement. An adjustment mechanism 48 drives the carriage 46 and objective lens component 12 in the vertical direction for elevation adjustments, as illustrated by arrows 52. A second adjustment mechanism (not shown) perpendicular to the first adjustment mechanism 48 may be provided for driving objective lens component 12 in the horizontal direction for windage adjustments. A spring (FIGS. 4-5) or other biasing device may be provided for biasing objective lens component 12 towards the adjustment mechanisms. Adjustment mechanism 48 may comprise any of a variety of mechanical or electro-mechanical actuators, and may include a threaded plunger 56 that is driven by rotation of a manually rotatable adjustment knob 60 projecting outwardly from housing 14, as described, for example, in U.S. Pat. No. 6,279,259 of Otteman, incorporated herein by reference.

A transparent optical element 64, such as a flat glass plate window or fixed objective lens component of a compound objective, is preferably fixedly mounted at a forward end 66 of housing 14 outward from movable objective lens component 12 to thereby hermetically seal housing 14 for maintaining a dry gas charge within housing 14 that inhibits fogging and condensation on internal lens surfaces. Adjustment mechanism 48 and eyepiece lens system 40 are also preferably hermetically sealed to housing 14 for the same reason. In the embodiment shown in FIG. 1, transparent optical element 64 preferably induces very little distortion and has essentially zero optical power—its main purpose being to provide a gas-tight seal, while allowing light to pass therethrough to objective lens component 12.

In the embodiment shown, a prism erector system 70 including a roof prism 72 and a delta prism or helper prism 74 is utilized, but alternative embodiments may include a lens erector system. Other erector systems may also be employed with the adjustable objective device described herein.

In the embodiment of FIG. 1, reticle 34 is a glass reticle disc mounted at the second (rear) focal plane 24. In alternative embodiments (not shown), a reticle or other aiming marks may be placed in a forward focal plane (not illustrated) between objective lens component 12 and rear focal plane 24; projected onto an outer surface of one of the erector prisms 72, 74, as described in U.S. Pat. No. 4,806,007 of Bindon; injected into the optical path (e.g., via a beam combiner device); or otherwise superimposed on the optical scene using any suitable means.

One possible advantage of non-tilting, laterally moving objective lens component 12, is that less lens movement may be required to achieve the same aiming adjustment as in other known systems, resulting in less image degradation than known methods. One embodiment of the optical design is illustrated in the ray trace diagrams of FIGS. 2A and 2B, representing the optical arrangement of FIG. 1 in two different positions. (In FIGS. 2A and 2B, the optical path through prism erector system 70 is illustrated unfolded.) In FIG. 2A, objective lens component 12 is shown on axis (centered) and in FIG. 2B objective lens component 12 is shown de-centered downwardly to achieve an elevation adjustment.

In one embodiment, objective lens component 12 has a clear aperture of 14 mm, an effective focal length of 44.77 mm and an f-number of 3.2 (f/3.2); and eyepiece 40 has the same effective focal length. In this embodiment, lateral movement of objective lens component 12 by 1.0 millimeter (1.0 mm) results in an image shift of approximately 77 minutes of angle (MOA) in object space relative to reticle 34, as illustrated in FIG. 2B by the vertical offset of rays passing through reticle 34 (compare to FIG. 2A). Image shift of 77 MOA is more than enough adjustment for sighting-in or "zeroing" of the riflescope to calibrate the aim of riflescope 10 at a nominal target range, while leaving available additional adjustment capacity to compensate for bullet trajectory variations for different ranges and shooting conditions.

Skilled persons will appreciate that other lens prescriptions would be possible for the movable objective component and eyepiece, depending on the riflescope's optical design. Thus, embodiments may provide an elevation or windage adjustment sensitivity ranging between approximately 15 MOA and 100 MOA of image shift in object space in response to one millimeter of lateral movement of the objective lens component (MOA/mm). Embodiments with greater than 25 MOA/mm and preferably greater than 50 MOA/mm or greater than 75 MOA/mm are possible utilizing the arrangement of optical elements and methods of adjusting them disclosed herein. In some riflescope embodiments, an image shift of approximately 100 MOA/mm or more may be feasible. It is noted that the concept of "sensitivity" of the adjustment is imperfect in this context, because the relationship between lateral adjustment and apparent image shift is a non-linear relationship. However, for very small adjustments of 100 MOA or less, the relationship can be characterized as approximately linear, and the MOA/mm ratio is therefore a reasonable measure of elevation or windage adjustment sensitivity in a riflescope.

The laterally adjustable objective device described herein may increase the total extent of elevation and windage adjustment possible in a compact riflescope. Adjustment mechanism 48 may preferably be configured to impart lateral movement to objective lens component 12 in relatively small incremental amounts, producing fractions of a minute-of-angle of image shift in object space (e.g. ½ MOA, ¼ MOA, or ⅛ MOA). Various riflescope adjustment mechanisms for providing incremental adjustment in a riflescope and tactile or auditory feedback are well known in the art.

FIGS. 3A and 3B illustrate an alternative optical design for a riflescope 10' according to another embodiment. With reference to FIGS. 3A and 3B, the objective lens system includes a primary objective lens component 12a', which is fixed to the housing (not illustrated) at its distal end, and a secondary objective lens component 12b' that is positioned between primary objective lens component 12a' and eyepiece 40' and mounted for lateral de-centration movement along a plane perpendicular to the optic axis of lens 12b' and parallel to reticle 34'. In FIGS. 3A and 3B, the secondary objective lens component 12b' is a Barlow lens, and is positioned between prism erector system 70' and reticle 34'. In other embodiments (not shown), the secondary objective lens component 12b' may be a Petzval lens, and may be positioned between the fixed primary objective lens component 12a' and prism erector system 70'. In still other embodiments, the primary objective lens component 12a' may be movably mounted for de-centration instead of (or in addition to) a separate secondary objective lens component 12b'.

FIGS. 4 and 5 illustrate mechanical details of riflescope 10, implementing a movable objective lens system of the kind shown in FIGS. 1, 2A and 2B. With reference to FIGS. 4 and 5, movable objective lens component 12 is mounted in a lens carriage 46 having axially-protruding forward and rear bearing surfaces 102, 104 distributed around the perimeter of objective lens component 12. On one side, the forward bearing surfaces 102 slide against a bearing way 110 within housing 14 and on the other side, the rear bearing surfaces 104 ride against a bearing washer 112. The bearing washer 112 is biased toward bearing way 110 by a bearing spring 120, comprising one or more wave springs or another type of spring or biasing device interposed between the bearing washer 112 and a bearing shelf 122 within housing 14 oriented generally perpendicular to the optic axis 16 and facing bearing way 110. Bearing spring 120 and bearing washer 112 ensure precise positioning and alignment of objective lens component 12 relative to the optic axis 16, while allowing sliding movement in a plane 20 (FIG. 1) perpendicular to the optic axis 16 of objective lens component 12, thereby facilitating adjustment of both elevation and windage in a compact mechanism. Lens carriage 64 is preferably biased firmly against bearing way 110 in a forward direction, i.e. bearing way 110 faces rearward toward eyepiece 40 to provide a solid forward foundation for lens carriage 64 to thereby inhibit recoil-induced movement of objective lens component 12. Bearing way 110 is preferably substantially planar and aligned perpendicular to optic axis 16. To reduce friction and provide for smooth adjustment of elevation and windage, the bearing surfaces 102, 104 of the lens carriage 46 may be fabricated of a low-friction plastic material, polished metal, or another low-friction material, and may be lubricated.

A spring plunger assembly 124 bears against housing 14 and lens carriage 46 opposite elevation adjustment mechanism 48 to bias the objective lens carriage 46 toward elevation adjustment mechanism 48. In one embodiment (not shown) a second spring plunger biases lens carriage 46 toward a windage adjustment mechanism (not shown). And in still another embodiment, a single spring plunger assembly biases lens carriage 46 toward both elevation adjustment mechanism 48 and a windage adjustment mechanism (not shown), simultaneously.

Objective lens component 12 is fixedly mounted in a lens holder 130 that is threaded into lens carriage 46 longitudinally along the optic axis 16 during manufacturing to precisely position objective lens component 12 at a desired longitudinal position relative to lens carriage 46. An objective lock ring 132 is then screwed into lens carriage 46 and tightened against lens holder 130 to lock lens holder 130 and objective lens component 12 firmly in place at the desired longitudinal position. In combination, the lens carriage 46, objective lens component 12, lens holder 130, and objective lock ring 132 comprise an objective lens cartridge that can be assembled outside of riflescope 10. During assembly, the longitudinal position of objective lens component 12 may be further adjusted by controlling the extent to which a window housing 140 of riflescope 10 is threaded into threads 144 of the main part of housing 14.

Window 64 is secured in window housing 140 at a distal end of riflescope 10 by a window lock ring 152 and sealed to window housing 140 by a window O-ring 154. At the opposite (proximal) end of riflescope 10, an eyepiece shell 160 holding eyepiece lenses 40 is threaded onto outer threads 164 of housing 14. Eyepiece shell 160 may be rotated on housing 14 to move eyepiece lenses 40 longitudinally along axis 16 to adjust a focus of riflescope 10. An eyepiece lock ring 170 is also threaded on outer threads 164 and can be tightened against eyepiece shell 160 to lock the focus adjustment of riflescope. An eyepiece shell retainer 180 is threaded into internal threads at the proximal end of housing 14 to prevent eyepiece shell 180 from being inadvertently threaded completely off, and to maintain a hermetic seal between eyepiece shell 180 and housing 14. Reticle 34 is mounted in a reticle holder 184 and held in place within housing 14 by a reticle lock ring 188.

It will be obvious to those having skill in the art that many changes may be made to the details of the above-described embodiments without departing from the underlying principles of the invention. The scope of the invention should, therefore, be determined only by the following claims.

The invention claimed is:

1. A riflescope mountable to a weapon and having a field of view, comprising:
   a housing;
   an eyepiece mounted at a first end of the housing;
   a transparent optical window fixedly mounted at a second end of the housing opposite the first end;
   a guide track positioned within the housing between the first and second ends, and proximal of the transparent optical element;
   an objective lens system comprising at least one objective lens component, the objective lens system being operative to form a forward-most image at a forward-most focal plane of the riflescope, the objective lens component (a) having an optic axis, (b) being disposed entirely in front of and distal to the forward-most focal plane, and (c) being slidably supported on the guide track for lateral, non-pivoting movement of the objective lens component relative to the housing along a plane perpendicular to the optic axis;
   an aiming mark displayed in the field of view; and
   an adjustment mechanism operatively engaged with the objective lens component for driving the objective lens component laterally along the guide track in a straight line and along a direction perpendicular to the optic axis of the objective lens component to thereby shift an image of a distant target relative to the aiming mark in order to compensate for ballistic elevation or windage.

2. The riflescope of claim 1, wherein the adjustment mechanism includes:
   a rotatable adjustment knob; and
   a plunger operatively coupled to the adjustment knob so that rotation of the adjustment knob drives the plunger along an axis of travel parallel to the plane of movement of the objective lens component.

3. The riflescope of claim 1, wherein the aiming mark is embodied in a reticle part mounted within the housing between the objective lens component and the eyepiece.

4. The riflescope of claim 1 further comprising:
   an erector system located between the objective lens component and the eyepiece for erecting an image produced by the objective lens component.

5. The riflescope of claim 4, wherein the erector system includes a prism erector system.

6. The riflescope of claim 1, wherein the objective lens component is slidably supported within the housing for movement along a vertical path to thereby achieve an elevation adjustment of the riflescope.

7. The riflescope of claim 1, wherein the objective lens component comprises a primary objective lens element, the riflescope further comprising a secondary objective lens element positioned between the primary objective lens element and the eyepiece, and spaced apart from the primary objective lens element.

8. The riflescope of claim 1, wherein the window and the eyepiece are sealed to the housing to maintain a fog-inhibiting dry gas charge within the housing.

9. The riflescope of claim 1, wherein the objective lens component is mounted on a lens carriage that is slidably guided on or in the guide track, and the adjustment mechanism drives the carriage for movement along the plane.

10. The riflescope of claim 9, wherein the lens carriage is made of a plastic material to reduce friction between the lens carriage and the guide track.

11. The riflescope of claim 9, wherein the guide track includes a rear-facing bearing way against which the lens carriage is biased and free to slide along the plane responsive to adjustment of the adjustment mechanism.

12. The riflescope of claim 1, further comprising a second adjustment mechanism driving the objective lens component for lateral, non-pivoting movement along a second straight line perpendicular to the straight line and the optic axis.

13. The riflescope of claim 1 including a focal plane, and wherein the plane along which the objective lens component moves is parallel to the focal plane.

14. The riflescope of claim 1, wherein an image of the target is shifted relative to the aiming mark at least 50 MOA in object space, in response to 1.0 mm of lateral movement of the objective lens component.

15. A method for adjusting the aim of a projectile weapon, using a riflescope mounted on the weapon, the riflescope including a housing, an eyepiece mounted at a first end of the housing and a transparent optical window fixedly mounted at a second end of the housing opposite the first end, the housing supporting an objective lens component having an optic axis, the method comprising:

forming a forward-most image with the objective lens component at a forward-most focal plane of the riflescope, the objective lens component (a) having an optic axis, (b) being disposed entirely in front of and distal to the forward-most focal plane, and (c) being slidably supported on the guide track for lateral, non-pivoting movement of the objective lens component relative to the housing along a plane perpendicular to the optic axis;

displaying an aiming mark in a field of view of the riflescope;

compensating for ballistic elevation or windage by laterally moving the objective lens component relative to the housing in a straight line perpendicular to the optic axis of the objective lens component without tilting the objective lens component relative to the housing, and thereby shifting an image of a distant target relative to the aiming mark; and superimposing the aiming mark on the image of the distant target in the field of view to thereby aim the weapon.

16. The method of claim 15, wherein movement of the objective lens component in the straight line adjusts an elevation setting of the riflescope, and further comprising:

laterally moving the objective lens component relative to the housing in a second straight line perpendicular to the straight line and the optic axis without tilting the objective lens component, and thereby adjusting a windage setting of the riflescope.

17. The method of claim 15, wherein the objective lens component includes a primary objective lens component located proximal of an end of the housing opposite an eyepiece of the riflescope, and the riflescope further comprises a secondary objective lens component fixedly mounted within the housing between the primary objective lens component and the eyepiece.

18. The method of claim 15, wherein the image of the distant target is shifted relative to the aiming mark at least 50 MOA in object space, in response to 1.0 mm of lateral movement of the objective lens component.

19. The riflescope of claim 1 wherein the at least one objective lens component comprises an objective lens assembly comprised of at least a second objective lens element and a first objective lens element, the second objective lens element being positioned between the first objective lens element and the eyepiece.

20. The riflescope of claim 19 wherein the first objective lens element and the second objective lens element are mounted in fixed relation to each other, wherein the objective lens assembly is slidably supported on the guide track for lateral, non-pivoting movement.

21. The riflescope of claim 1, wherein the entire objective lens system is driven laterally with the objective lens component.

\* \* \* \* \*